United States Patent [19]
Protte

[11] Patent Number: 5,857,404
[45] Date of Patent: Jan. 12, 1999

[54] PEELING MACHINE

[75] Inventor: Christoph Protte, Delbruck, Germany

[73] Assignee: HEPRO GmbH Maschinen und Spezialgerate, Delbruck, Germany

[21] Appl. No.: 855,231

[22] Filed: May 13, 1997

[51] Int. Cl.$^6$ .............................. A23N 7/00; A23N 7/04
[52] U.S. Cl. .............................. 99/491; 99/489; 99/589; 99/590; 99/591
[58] Field of Search ............................. 99/588–591, 643, 99/536, 546, 584, 585, 540, 486, 541, 489–491; 426/481–483

[56] References Cited

U.S. PATENT DOCUMENTS

| | | | |
|---|---|---|---|
| 4,212,237 | 7/1980 | Hsu | 99/589 |
| 4,446,782 | 5/1984 | Black | 99/590 X |
| 5,146,681 | 9/1992 | Haghkar | 99/591 X |
| 5,669,293 | 9/1997 | Sommer | 99/541 X |

FOREIGN PATENT DOCUMENTS

| | | | |
|---|---|---|---|
| 217967 | 12/1908 | Germany | 99/591 |

*Primary Examiner*—Timothy F. Simone
*Attorney, Agent, or Firm*—Sheppard, Mullin, Richter & Hampton LLP

[57] ABSTRACT

A peeling machine for stalk-like vegetables, comprising a plurality of knife stations that are successively arranged in the direction of travel of the vegetables on a machine frame, is described. A plurality of pairs of feed rollers are each supported between successive knife stations, each of the feed rollers being supported by a drive shaft rotating on a pivot arm, which is in turn supported by the machine frame to pivot about a stationary shaft on the machine frame. Each pair of feed rollers is coupled to a driving apparatus that includes a motor. The stationary shaft supports a first drive wheel of the driving apparatus, the first drive wheel being in driving communication with a second drive wheel, which is secured to the drive shaft of the feed roller.

33 Claims, 8 Drawing Sheets

PEELING MACHINE

BACKGROUND OF THE INVENTION

The present invention relates to a peeling machine, and in particular to a peeling machine for stalk-like vegetables.

Different types of peeling machines for stalk-like vegetables, such as asparagus, cucumber, carrots, black salsify, radishes, or the like, are known in the art. They typically comprise a plurality of knife stations successively arranged on a machine frame along a direction of travel of the vegetables. They also typically include a plurality of pairs of feed rollers which are each supported between two neighboring knife stations to transport the stalk-like vegetables and to push them through the knife stations. Circumferential portions of the vegetable stalks are respectively peeled off in the knife stations. The pairs of feed rollers are connected to a drive means for applying the necessary advance movement. An apparatus of the above-mentioned type is, for example, described in German patent 44 12 561.

The prior-art peeling machines are each designed for a specific type of product to be processed, for example, a machine might be designed for asparagus stalks. The product has substantially uniform dimensions, so that the type and arrangement of the pairs of feed rollers as well as the knife stations can be adapted thereto. As a result, the products to be processed can no longer be changed at will or can only be changed by taking considerable efforts in altering the configuration of the machine.

SUMMARY OF THE INVENTION

It is the object of the present invention to provide a peeling machine for stalk-like vegetables that is of a simple construction and that can easily be handled in an operationally reliable manner for treating a wide variety of products, and can thus be used in a universal manner across various applications.

The peeling machine of the present invention includes a plurality of knife stations which are successively arranged in the direction of travel of the vegetable on a machine frame. A plurality of pairs of feed rollers are supported between successive knife stations, with each pair of feed rollers being connected to a means for rotationally driving the feed rollers.

Each knife station is supported on a quick-change carrier that is removably secured to the machine frame. Preferably, each of the feed rollers is supported by means of a drive shaft on a pivot arm the pivot arm being supported on the machine frame to pivot about a stationary shaft. The stationary shaft is arranged in a direction perpendicular to the direction of travel of the vegetables. The stationary shaft preferably supports a rotatable first drive wheel of the drive means, which is in driving communication with a second drive wheel that is secured to the drive shaft.

The peeling machine of the invention is characterized by several considerable advantages. Since the feed roller itself is supported on a pivot arm, it is possible to vary the distance between the feed rollers over a wide range without any constructional changes or retrofitting work being required. Hence, the most different vegetables can be processed in any desired order; for instance, cucumbers, carrots, asparagus, etc. Since each feed roller is driven via its respective first and second drive wheels, the drive parameters of the feed roller are not changed by a pivoting of the pivot arm. This means that the adjusted advance speed can be exactly maintained, so that optimum cutting conditions prevail at the knives.

Another advantage is that the drive of the peeling machine can be of a simple construction which is not prone to failure, and thus a high degree of operational reliability is ensured. The first drive wheel and the second drive wheel are advantageously designed as gears which are in meshing engagement with each other. A slip-free drive is thereby ensured on the one hand and it is possible on the other hand to provide the two gears with different reference diameters to additionally provide a transmission function.

Preferably, the first drive wheel is directly coupled with a motor of the drive means, for instance by connection to a pulley which is driven by a belt drive of the drive means. The belt drive may be designed as a double-sided toothed belt which winds around the pulley.

The feed roller is preferably supported via a freewheel device on the drive shaft in order to take into account slight changes in diameter of the vegetables to be processed, and thus to avoid any damage to the vegetable stalks.

Preferably, a pressure exerting means is arranged between the pivot arm and the machine frame, to assure that the feed rollers provide a sufficient contact pressure on the vegetable stalks. The pressure exerting means may comprise a piston-cylinder unit or a spring means. Particularly with relatively heavy vegetables, such as cucumbers, a reliable transportation is ensured through sufficient contact pressure by the feed rollers.

Since a universal use of the peeling machine may require the use of different feed rollers, such as profiled feed rollers, or such as feed rollers of different elasticity or diameter, the feed rollers are preferably secured to the drive shaft by a bayonet lock. The feed rollers can thus be removed easily, for performing cleaning or maintenance work, and for other tasks.

Depending on the construction of the knife stations, it may be preferable to operate the knife stations by means of a control device that controls the movement and contact pressure of the knives. The knives are preferably closed when a vegetable to be processed is located in the area of the knife station, whereas the knives are opened in the absence of a cutting operation. This serves to apply an optimum cutting force and to remove peeled-off surface portions or chips of the product to be processed. It is also preferable to use a sensor between the pivot arm and the machine frame, or otherwise in the area of the pivot arm, for sensing the pivotal movement of the pivot arm, to control the knife stations. The sensor reacts to the entry of a product into the respective pair of feed rollers and permits the operation of the pair of knife-station knives that are directly downstream of the pair of feed rollers.

Depending on the product to be processed, the feed roller can be adapted with respect to its material and dimensions. For instance, the feed roller can be made from a flexible material or a rigid material. Likewise, the shape of the feed roller may have a cylindrical shape, or may be of some other shape, such as having reduced diameter in its center portion.

The usefulness of the peeling machine over a range of products is further enhanced by having each of the knife stations supported on a quick-change carrier that is secured to the machine frame. Thus, the individual knife stations can be removed more easily. This facilitates both the cleaning of the knife stations and the maintaining of the peeling machine, such as the replacement of the knives. Furthermore, the quick-change carriers make the use of different knife stations possible, which allows for knife stations that are exactly adapted to specific products to be processed.

Preferably, the quick-change carrier comprises a vertical carrier plate which is provided with a recess for guiding the vegetables therethrough. The carrier plate additionally serves as a baffle element to intercept and discharge peeled-off chips or surface portions of the preceding knife station.

Furthermore, it is preferable that the knife stations be designed to be used with a wide diameter range of vegetables. To this end, each knife of the knife station is supported on an inlet plate, which is pivotally mounted on the carrier plate. When entering the knife station, a vegetable stalk will first come into contact with the inlet plate, it will pivot the same and it is only then that the stalk will touch the already opened knives. Hence, the vegetable stalk is prevented from directly abutting on the knives and is protected against damage. Disorders in the operational sequence can thereby be avoided.

It is particularly preferable for the pivot axis of the inlet plate to be substantially located in the plane of the carrier plate. Moreover, it is advantageous when the inlet plates are elastically biased into a closing position of the knife unit. An elastic bias serves, among other things, to exert a sufficient contact pressure of the knives during the cutting operation.

Depending on the number of knife stations and on the type of product to be processed, it may be preferable for the knives to have either a straight or an arcuate shape.

The peeling machine of the invention is suited for a horizontal and also a vertical passage of the products. A horizontal arrangement is particularly preferable in the case of elongated, lightweight vegetables, such as asparagus, whereas heavy and relatively short products of an increased diameter, such as cucumbers, are preferably processed with the aid of a vertically arranged peeling machine.

Other features and advantages of the invention will become apparent from the following detailed description of the preferred embodiments, taken in conjunction with the accompanying drawings, which illustrate, by way of example, the principles of the invention.

DETAILED DESCRIPTION OF THE PREFERRED EMBODIMENTS

Figure 1:
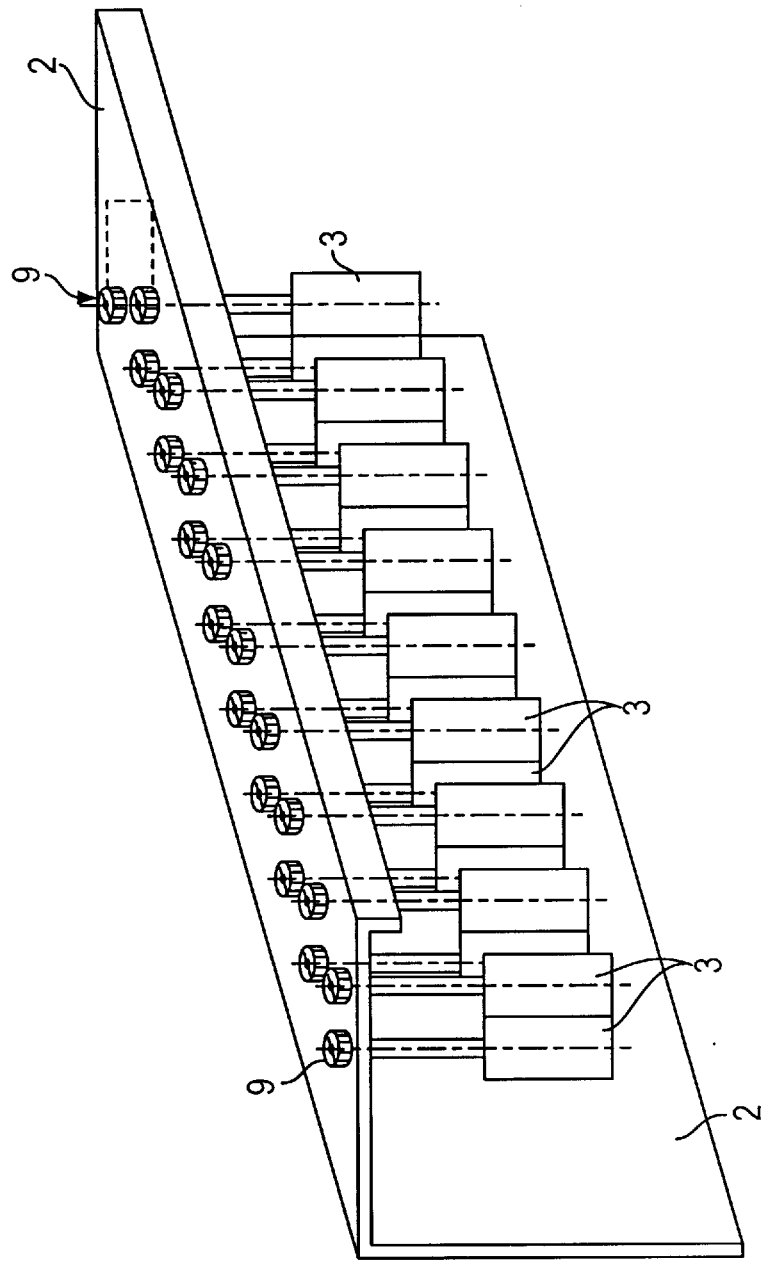
FIG. 1 is a perspective partial view of a machine frame and feed rollers of a peeling machine embodying features of the present invention.

FIG. 1 is a diagrammatic view of a machine frame 2 which has supported thereon a plurality of pairs of feed rollers 3. Drive and support of the pairs of feed rollers will be described in detail below.

Figure 2:
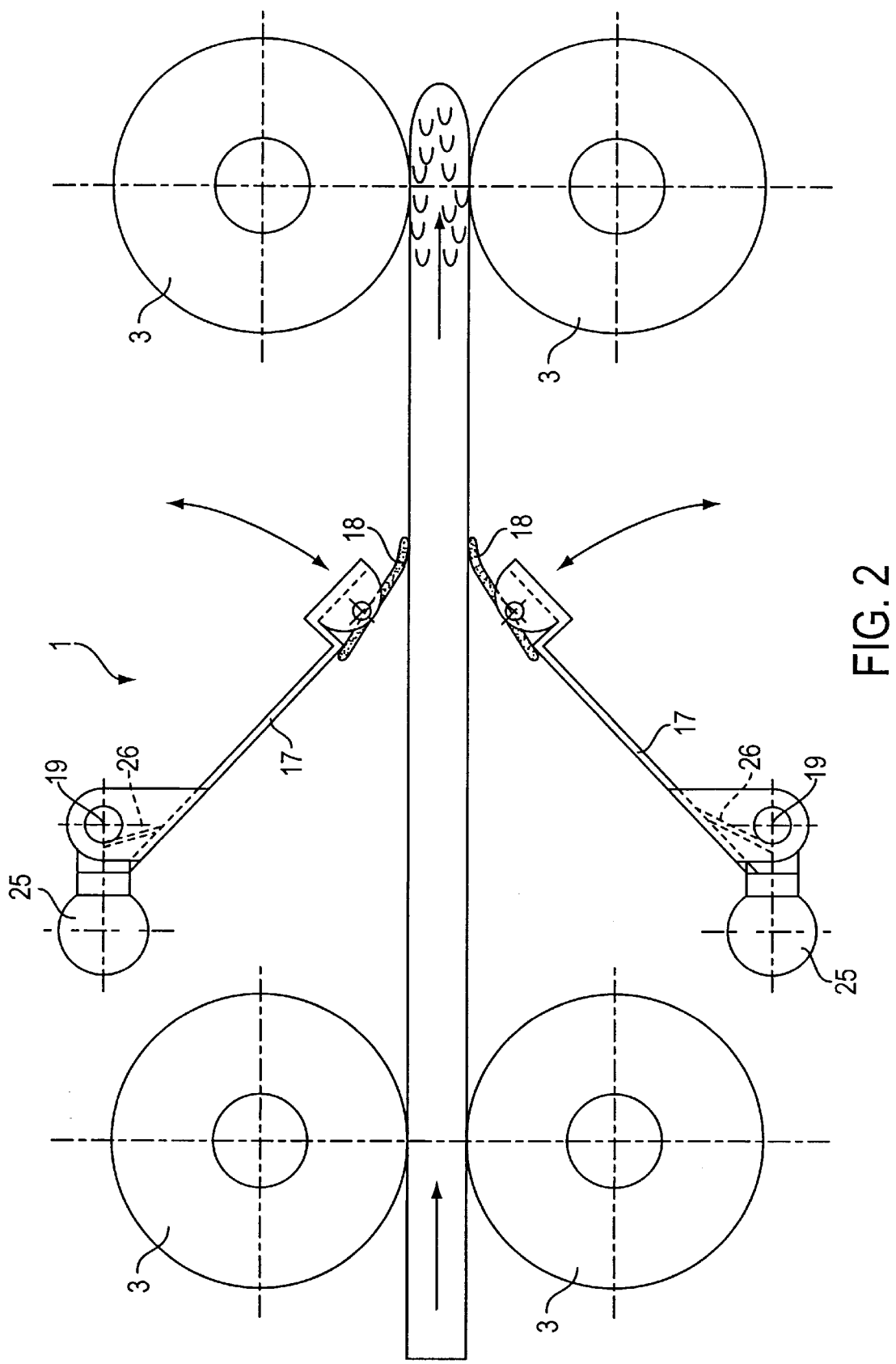
FIG. 2 is a top plan view of an asparagus traveling through feed rollers and a knife unit of the peeling machine of FIG. 1.

FIG. 2 is a very simplified illustration showing the travel of an asparagus stalk through a knife unit 1. For the sake of clarity, the figure does not show the peeling off of the surface in detail; rather, the application of the knife unit and the pairs of feed rollers to a vegetable to be processed are illustrated in the figure. The individual components of the knife unit will be described in detail hereinafter.

Figure 3:
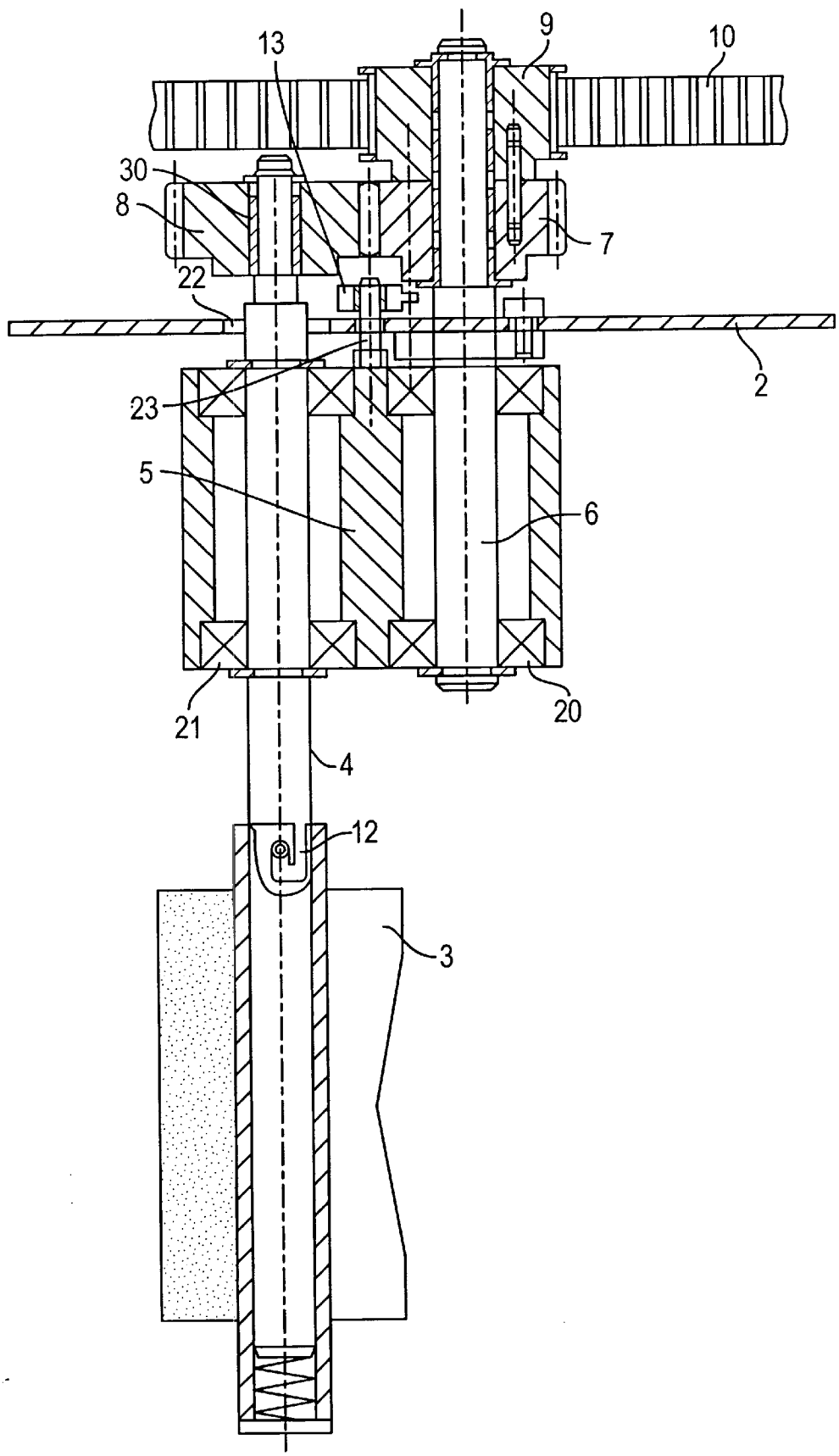
FIG. 3 is an elevational view of a feed roller supported on a pivot arm, and connected to a drive means, of the peeling machine of FIG. 1.

FIG. 3 is a lateral sectional view of a portion of a machine frame 2 which carries a stationary shaft 6. With the aid of bearings 20, stationary shaft 6 carries an elongated pivot arm 5, the other end of which has rotatably supported thereon a drive shaft 4 by means of bearings 21. A feed roller 3 is secured by means of a bayonet lock 12 to the lower end of drive shaft 4 for rotation therewith. The feed roller 3 may have a cylindrical shape, but may also have a reduced diameter in its center portion, as shown in the right half of the FIG. 3 roller. The upper end portion of drive shaft 4 extends through a recess 22 of the machine frame 2, so that the machine frame does not obstruct any pivotal movement of pivot arm 5 and thus of drive shaft 4.

The upper end of drive shaft 4 is connected to a freewheel device 30 comprising a second drive wheel 8 (gear) which meshes with a first drive wheel 7 that is rotatably supported on stationary shaft 6. The freewheel device blocks in one direction to ensure transportation of the products, but permits a damage-free advance movement of the products in cases where the traveling speed thereof is greater than the circumferential speed of the feed rollers 3. A pulley 9 which is connected to the first drive wheel 7 for rotation therewith is also rotatably supported on stationary shaft 6. Hence, a rotation of pulley 9 will automatically effect a rotation of the first drive wheel 7 and thus a rotation of the second drive wheel 8 which, in turn, will drive the drive shaft 4 and thus feed roller 3. This drive connection is independent of the respective pivotal position of pivot arm 5.

Furthermore, FIG. 3 shows a detector bolt 23 which is secured in the center portion of pivot arm 5. Detector bolt 23 cooperates with a sensor 13 which reports the respective position of pivot arm 5 to a control device (not shown).

Figure 4:
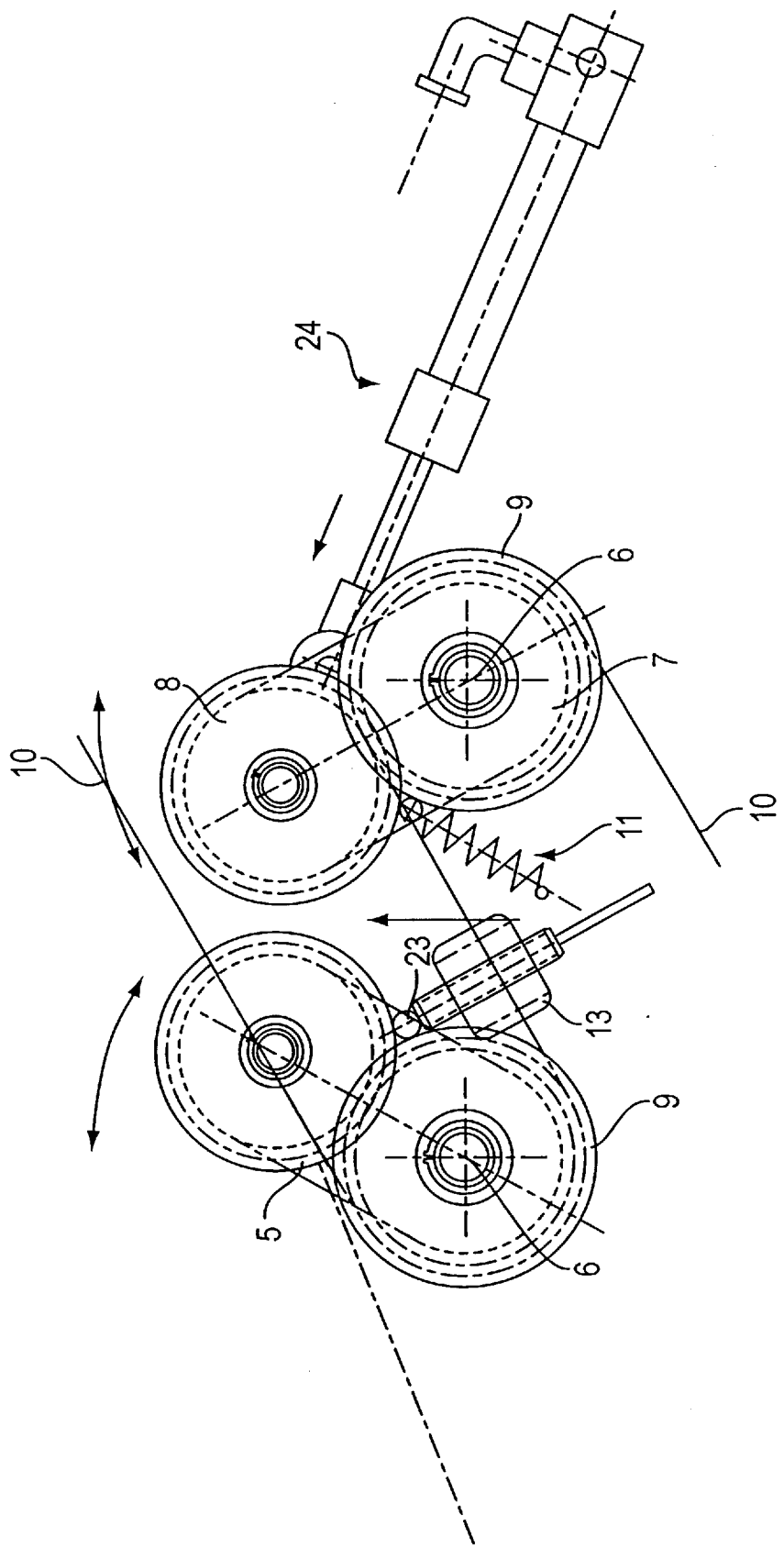
FIG. 4 is a top plan view of a pair of feed rollers of the peeling machine of FIG. 1.

FIG. 4 is a top view of the arrangement shown in FIG. 3. For the sake of a clear representation the illustrated pressure exerting means can only be seen in the right half of the figure; this is also applicable to sensor 13, which may also be present in double form.

FIG. 4 particularly shows the arrangement of the two pulleys 9 and of the belt drive 10. The latter winds in S-shaped configuration around the two pulleys 9. It is obvious that the belt drive 10 drives all of the pulleys 9 of the individual pairs of feed rollers and is additionally guided over a drive wheel (not shown) which is assigned to a motor.

In the right half of the symmetrical illustration of FIG. 4, there is shown a spring means 11 which is designed as a tension spring for biasing the pivot arms 5 into a closing position. However, it is also possible to arrange the spring means 11 at the opposite side of the pivot arm 5 and to design the same as a pressure spring means. Alternatively, there may also be provided a piston-cylinder unit 24 for pivoting the respective pivot arm 5 and for exerting a sufficient contact pressure of the feed rollers 3 on the vegetable to be transported.

In the central portion of FIG. 4, a straight arrow indicates the direction of travel of the vegetable stalk whilst the arcuate double-headed arrows illustrate the pivoting possibility of the pivot arms 5 and of the feed rollers 3 (shown in FIG. 3) which are supported thereon.

Furthermore, FIG. 4 shows how the sensor 13 is assigned to the detector bolt 23. As is apparent from FIG. 3, bolt 23 is received in a recess of the machine frame 2 (not shown in more detail), so that the detector bolt 23 does also not obstruct a pivotal movement of the pivot arm 5.

Figure 5:
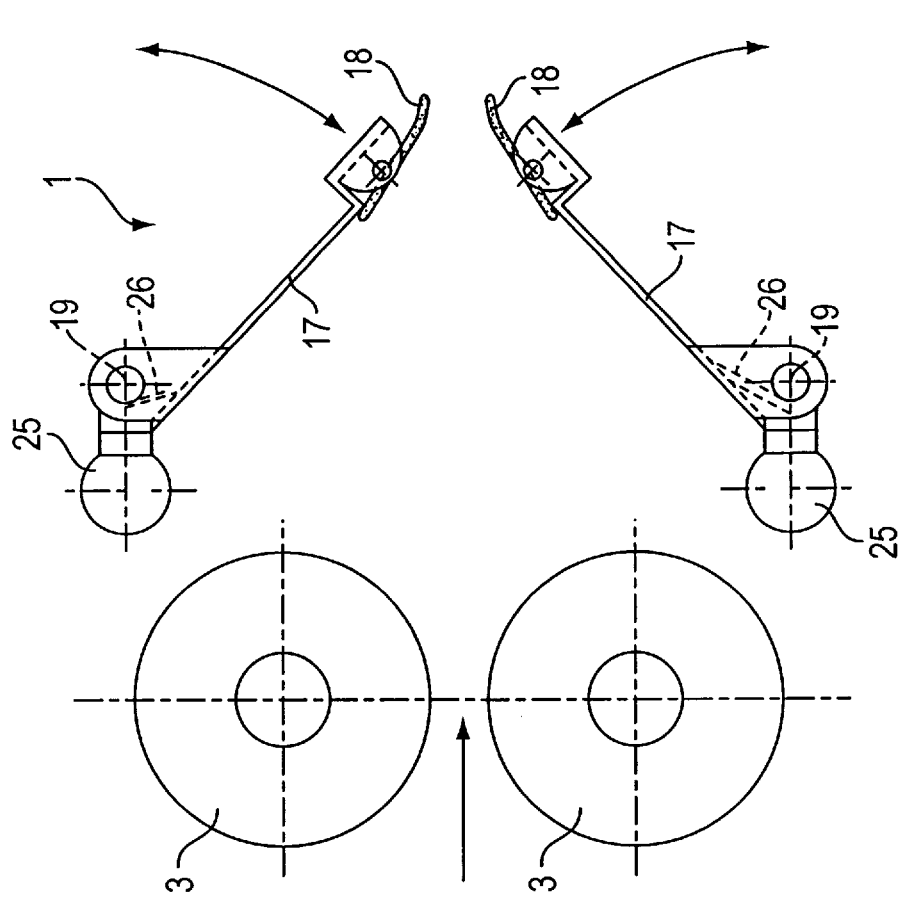
FIG. 5 is a top plan view of a knife station of the peeling machine of FIG. 1.
Figure 5:
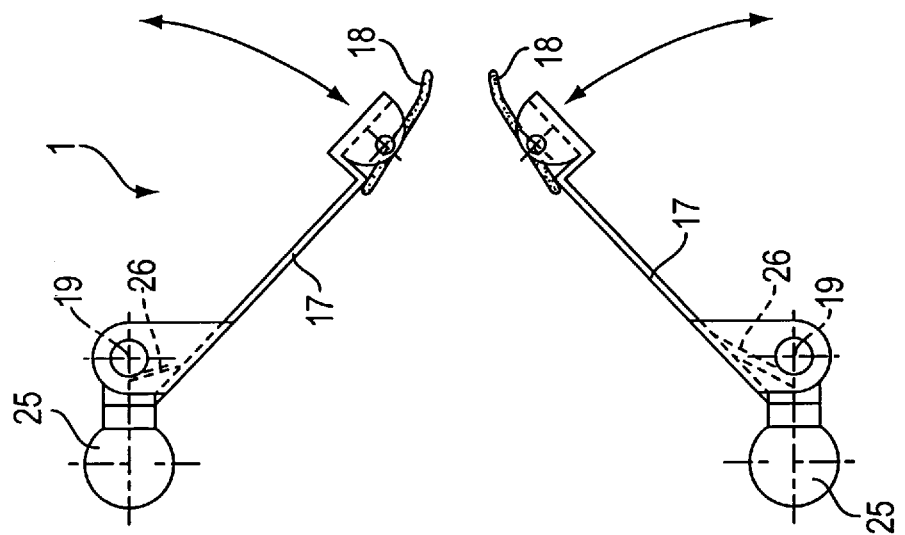

FIG. 5 is a diagrammatic top view on a pair of feed rollers 3 and shows the direction of travel of the vegetable through the feed rollers (see arrow). Furthermore, there is shown a top view of a knife station 1. A carrier 25 has supported thereon a respective inlet plate 17 which is pivotable about a pivot axis 19 and is biased by a spring 26, which is only shown diagrammatically, into a closing position. The arcuate double-headed arrows illustrate the pivoting possibility of the inlet plates 17, which carry knifes 18 at their respective free ends. The knives 18 are designed in a known manner, and are pivotally supported on the free ends of the inlet plates 17.

Figure 6:
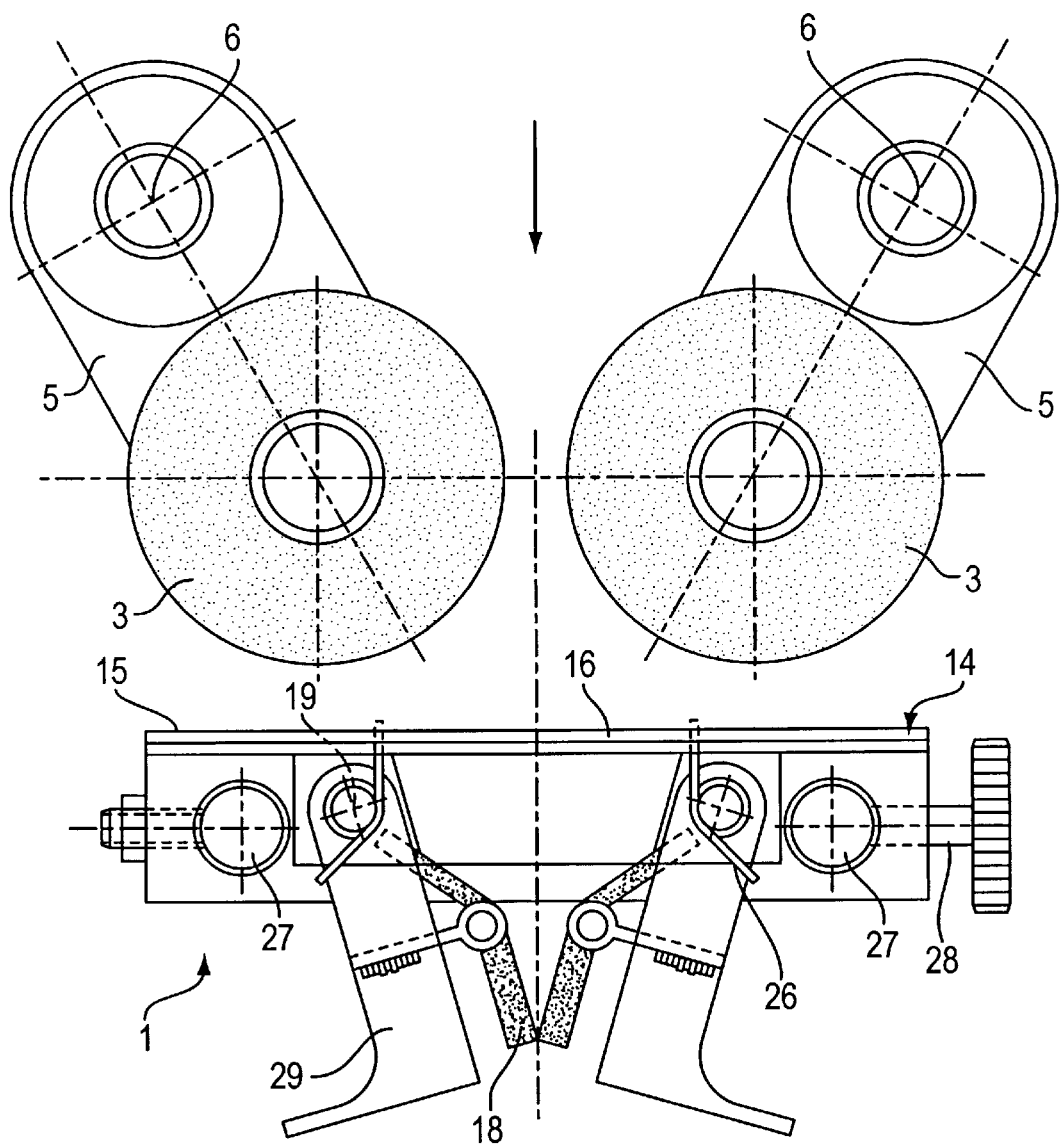
FIG. 6 is a bottom plan view of the knife station depicted in FIG. 5, depicting detachable aspects of the invention.

FIG. 6 shows a further embodiment in which the feed rollers 3 and the associated pivot arms 5 as well as the direction of travel of the vegetable (see arrow) can be seen in a diagrammatic bottom view. The knife station 1 comprises a quick-change carrier 14 which includes a carrier plate 15 detachably supported on the machine frame. The plate can, for instance, be supported via bolts 27 which are provided with an annular groove. For instance, an adjusting screw 28 or a ball-type stop bolt engages into the annular groove. Hence, a positioning operation is carried out with the ball-type stop bolt, while an additional fixing operation is performed by the adjusting screw 28. The carrier plate 15 is thus positioned and secured against unintended detachment.

The knives 18 are also pivotally supported on support arms that, in turn, are supported on the carrier plate 15 to pivot about a pivot axis 19. In its center portion the carrier plate 15 comprises a recess 16 through which the vegetable is guided. The knives 18 may be shaped in the manner of arcuate knives; they are also biased by springs 26 into a closed position.

Figure 7:
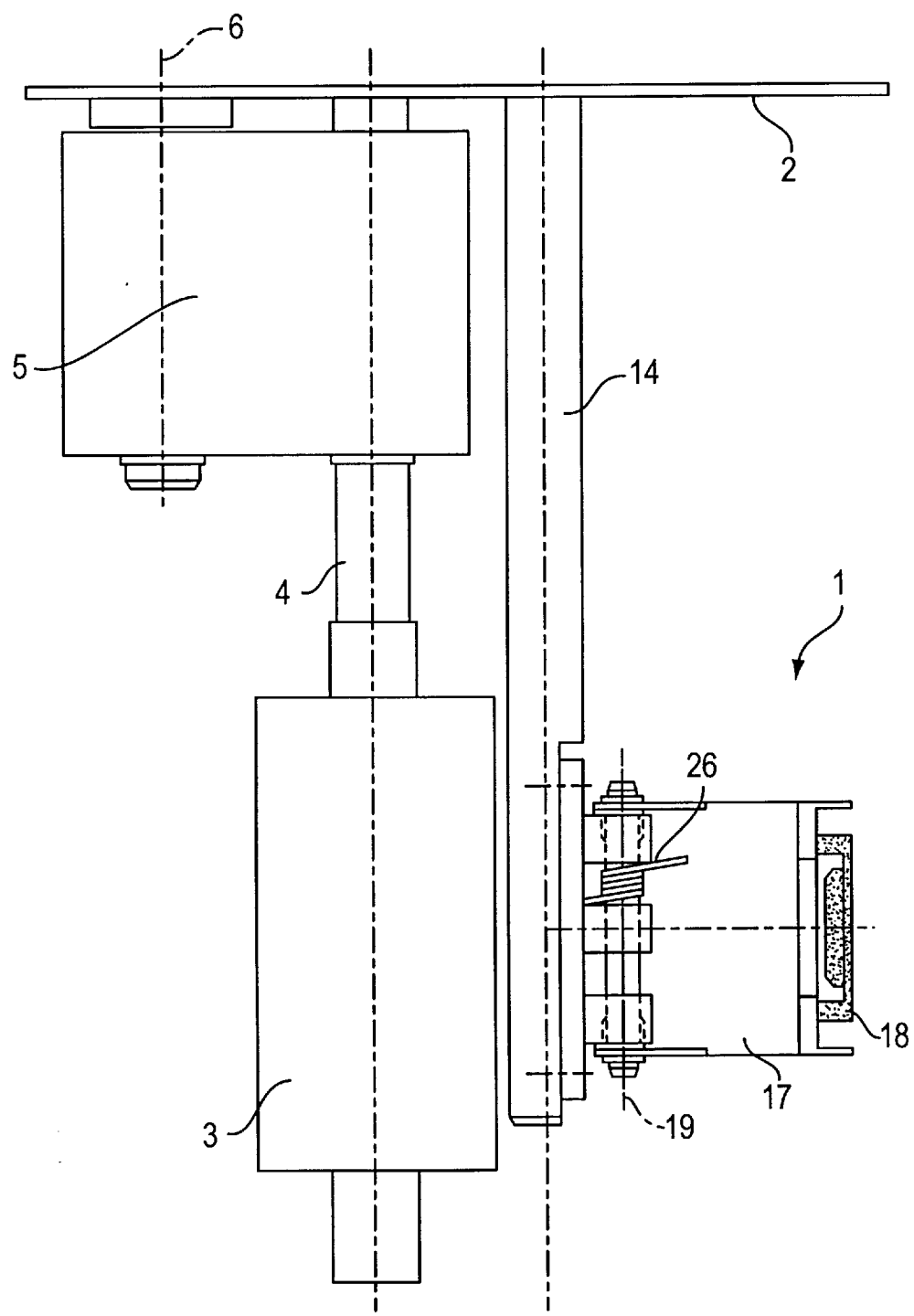
FIG. 7 is an elevational view depicting support structure for supporting the feed roller of FIG. 3.

FIG. 7 is a simplified lateral view showing the support of the feed roller 3, as already depicted in FIG. 3, by means of drive shaft 4 and pivot arm 5. Furthermore, a knife station 1 which has a structure similar to the one depicted in FIGS. 5 and 6 is shown in a side view.

Figure 8:
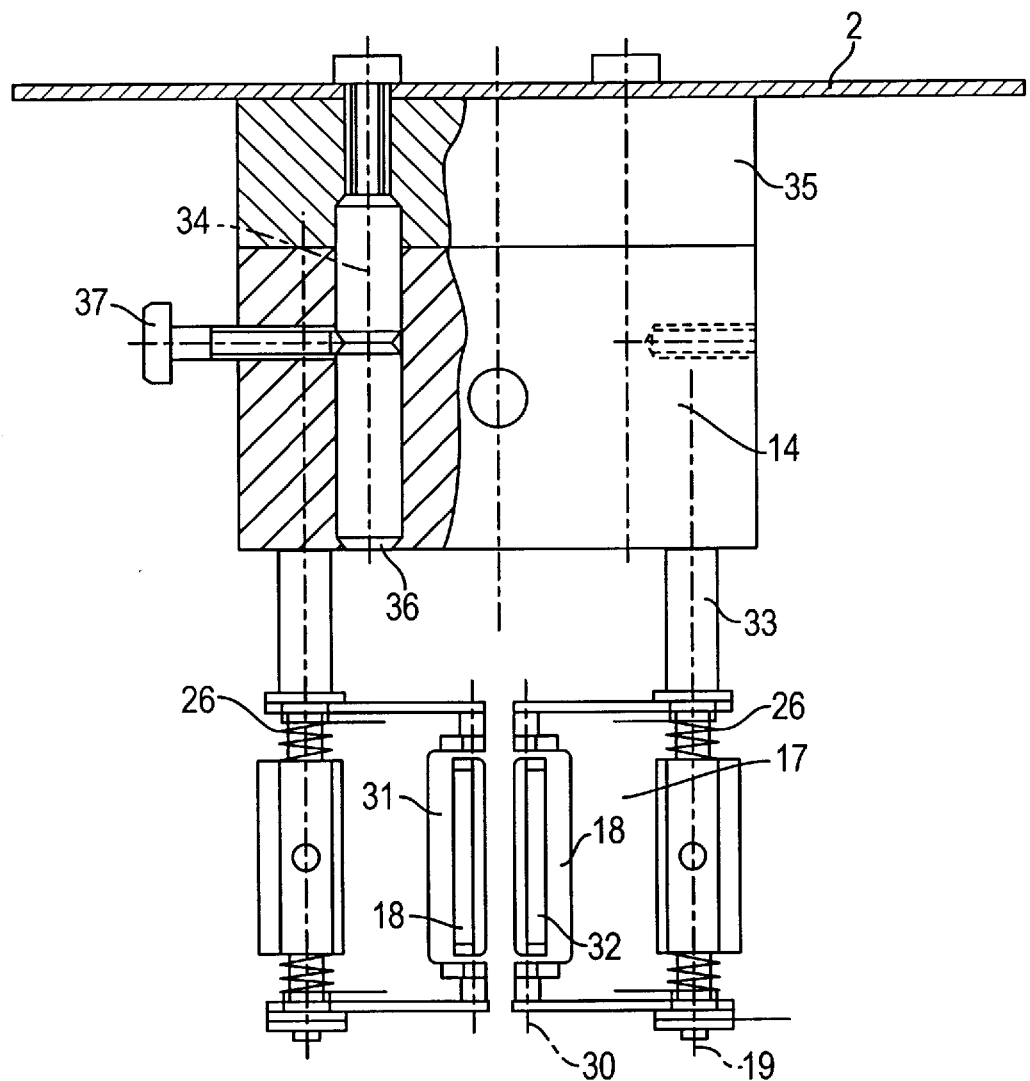
FIG. 8 is an elevational view of the knife station depicted in FIG. 5.

FIG. 8 shows a further embodiment of the knife unit which is very similar to the embodiment shown in FIG. 5. The knives are each supported on the inlet plate 17 about a pivot axis 30 and comprise, in detail, a knife carrier 31 which is equipped with a blade 32. A biasing operation is performed by the already described springs 26 whereby the inlet plate 17 and thus the knives are biased. The inlet plate 17 is pivotable about pivot axis 19; the pivot axis 19 is formed by a stay bolt 33 which, in turn, is secured to the plate-like quick-change carrier 14. Two downwardly oriented stay bolts 34 are secured to the machine frame 2 by means of a bearing block 35; the stay bolts 34 can be inserted into corresponding recesses 36 of the quick-change carrier 14; they comprise an annular groove into which an adjusting screw 37 can be screwed (see left half of FIG. 8). It is very easily possible by way of unscrewing screw 37 to remove the quick-change carrier 14 downwards; the groove always guarantees an accurately fitting position in the mounted state.

It is possible with the peeling machine of the invention to process stalk-like vegetables of very different diameters without any retrofitting work or constructional changes being required. This is assured by both the above-described arrangement and support of the pairs of feed rollers, and by the inventive design of the knife stations.

To sum up, the following should be noted:

The present invention relates to a peeling machine, in particular for stalk-like vegetables, comprising a plurality of knife stations which are successively arranged in the direction of travel of the vegetable on a machine frame, and a plurality of pairs of feed rollers which are each supported, in particular, between two knife stations, with each pair of feed rollers being connected to a drive means, characterized in that each of the feed rollers is rotatably supported by means of a drive shaft on a pivot arm which is supported on the machine frame to pivot about a stationary shaft arranged in a direction perpendicular to the direction of travel of the vegetables, and that the stationary shaft has supported thereon a first drive wheel of the drive means which is in driving communication with a second drive wheel that is secured to the drive shaft of the feed roller.

While a particular form of the invention has been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the invention. Accordingly, the invention is not intended to be limited, and is defined with reference to the following claims.

I claim:

1. A peeling machine for peeling stalk-like vegetables, comprising:

a machine frame defining a direction of travel for the vegetables;

a plurality of knife stations having one or more knives, the knife stations being successively arranged on the machine frame along the direction of travel for the vegetables;

a plurality of pairs of feed rollers that are each rotatably supported between successive knife stations by a plurality of support apparatus, each support apparatus including a stationary shaft on the machine frame, the stationary shaft extending in a direction perpendicular to the direction of travel for the vegetables, a pivot arm, supported on the machine frame, the pivot arm configured to pivot about the stationary shaft, and a drive shaft, supported on the pivot arm, the drive shaft supporting the feed roller while allowing it to rotate; and a drive apparatus configured to drive the plurality of pairs of feed rollers, the drive apparatus including a plurality of first drive wheels, each first drive wheel supported to rotate on one of the stationary shafts, and a plurality of second drive wheels, each second drive wheel supported on one of the drive shafts, each second drive wheel being in driving communication with one of the first drive wheels, and each second drive wheel also being in driving communication with a feed roller.

2. The peeling machine according to claim 1, wherein the first drive wheels and the second drive wheels are formed as gears that are in meshing engagement with each other.

3. The peeling machine according to claim 1, wherein the drive apparatus includes a motor coupled to the first drive wheels.

4. The peeling machine according to claim 3, wherein each first drive wheel is coupled to a pulley that is driven by the motor with a belt drive.

5. The peeling machine according to claim 1, wherein the second drive wheel is supported on the drive shaft by a freewheel device.

6. The peeling machine according to claim 1, wherein the pivot arm is pivotally loaded from the machine frame.

7. The peeling machine according to claim 6, wherein the pivot arm is loaded from the machine frame by a piston-cylinder unit.

8. The peeling machine according to claim 6, wherein the pivot arm is loaded from the machine frame by a spring.

9. The peeling machine according to claim 1, wherein the feed roller is detachably secured to the drive shaft.

10. The peeling machine according to claim 9, wherein the feed roller is detachably secured to the drive shaft by a bayonet lock.

11. The peeling machine according to claim 1, and further comprising one or more sensors configured for sensing the pivotal position of one or more pivot arms.

12. The peeling machine according to claim 11, and further comprising a control device connected to the sensors, the control device configured for operating the knife stations.

13. The peeling machine according to claim 1, wherein the feed roller is composed of a flexible material.

14. The peeling machine according to claim 1, wherein the feed roller is composed of a rigid material.

15. The peeling machine according to claim 1, wherein the feed roller is cylindrical.

16. The peeling machine according to claim 1, wherein the feed roller has a smaller diameter in a central portion than at either of two end portions.

17. The peeling machine according to claim 1, wherein one or more of the knife stations are supported on one or more quick-change carriers that are removably secured to the machine frame.

18. The peeling machine according to claim 17, wherein the quick-change carriers include a vertical carrier plate defining a recess for guiding the vegetables therethrough.

19. The peeling machine according to claim 18, wherein for each knife station supported on a quick-change carrier, each knife is supported on an inlet plate that is pivotally supported on the quick-change carrier.

20. The peeling machine according to claim 19, wherein the inlet plates are pivotally supported on the quick-change carrier around a pivot axis that is substantially located in the plane of the carrier plate.

21. The peeling machine according to claim 19, wherein the inlet plate is elastically biased into a closing position of the knife station.

22. The peeling machine according to claim 1, wherein the knives each have a straight cutting edge.

23. The peeling machine according to claim 1, wherein the knifes each have an arcuate cutting edge.

24. A peeling machine for peeling stalk-like vegetables, comprising:
   a machine frame defining a direction of travel for the vegetables;
   a plurality of knife stations successively arranged along the machine frame in the direction of travel for the vegetables;
   one or more quick-change carriers that are removably secured to the machine frame, wherein each knife station is supported on a quick-change carrier;
   a plurality of pairs of feed rollers that are each rotatably supported on the machine frame between successive knife stations; and
   a drive apparatus configured to drive the plurality of pairs of feed rollers.

25. The peeling machine according to claim 24, wherein each knife station comprises one or more knives and one or more inlet plates, each knife being supported on an inlet plate, each inlet plate being pivotally supported on one of the one or more quick-change carriers.

26. The peeling machine according to claim 25, wherein each quick change carrier includes a vertical carrier plate, and wherein the inlet plates are pivotally supported on the quick-change carrier around a pivot axis that is substantially located in the plane of the carrier plate.

27. The peeling machine according to claim 25, wherein the inlet plate is elastically biased into a closing position of the knife station.

28. The peeling machine according to claim 26, wherein the vertical carrier plate defines a recess for guiding the vegetables therethrough.

29. The peeling machine according to claim 25, wherein the knives each have a straight cutting edge.

30. The peeling machine according to claim 25, wherein the knives each have an arcuate cutting edge.

31. The peeling machine according to claim 25, wherein each knife comprises knife components including a blade and a carrier, and wherein the blade is detachably secured to the carrier.

32. The peeling machine according to claim 31, wherein each blade is detachably secured to its carrier by a screw.

33. The peeling machine according to claim 31, and further comprising alternative knife components that are configured to be installable in the knife stations to vary the gap width and the cutting depth of the knife station.

* * * * *